(12) United States Patent
Steinke

(10) Patent No.: US 9,619,916 B2
(45) Date of Patent: Apr. 11, 2017

(54) METHOD FOR TRANSMITTING DIGITAL SCENE DESCRIPTION DATA AND TRANSMITTER AND RECEIVER SCENE PROCESSING DEVICE

(75) Inventor: Bernd Steinke, Luedenscheid (DE)

(73) Assignee: Dream CHIP Technologies GmbH, Garbsen (DE)

( * ) Notice: Subject to any disclaimer, the term of this patent is extended or adjusted under 35 U.S.C. 154(b) by 255 days.

(21) Appl. No.: 14/118,936

(22) PCT Filed: May 20, 2011

(86) PCT No.: PCT/EP2011/002525
§ 371 (c)(1),
(2), (4) Date: Nov. 20, 2013

(87) PCT Pub. No.: WO2012/159640
PCT Pub. Date: Nov. 29, 2012

(65) Prior Publication Data
US 2014/0085314 A1   Mar. 27, 2014

(51) Int. Cl.
*G06T 13/80* (2011.01)
*G06T 13/00* (2011.01)
(Continued)

(52) U.S. Cl.
CPC ............... *G06T 13/80* (2013.01); *G06F 3/14* (2013.01); *G06T 9/001* (2013.01); *G06T 13/00* (2013.01);
(Continued)

(58) Field of Classification Search
None
See application file for complete search history.

(56) References Cited

U.S. PATENT DOCUMENTS

2006/0184652 A1* 8/2006 Teodosiu ............... H03M 7/30
   709/221
2009/0138318 A1* 5/2009 Hawkins ............... G06F 9/5038
   705/7.27
(Continued)

FOREIGN PATENT DOCUMENTS

DE   102007018952 A1   10/2008
DE   102007043123 A1    4/2009
(Continued)

*Primary Examiner* — Tize Ma
(74) *Attorney, Agent, or Firm* — Whitham, Curtis & Cook, P.C.

(57) ABSTRACT

A method for transmitting digital scene description data from a transmitter scene processing device to at least one receiver scene processing device is disclosed. The method comprises the steps of encoding of scene description data and rendering commands in the transmitter scene processing device by setting of priorities for the scene description data and related rendering commands and dynamically reordering the scene description data and related rendering commands depending on the respective priorities in order to reduce the bandwidth required for transmission and/or to adapt to unreliable bandwidth; and transmitting the encoded scene description data and related rendering commands to the at least one receiver scene processing device for decoding and executing the rendering commands in relation to the transmitted scene description data by the at least one receiver scene processing device to achieve animated digital graphic.

12 Claims, 2 Drawing Sheets

(51) Int. Cl.
*G06F 3/14* (2006.01)
*G06T 9/00* (2006.01)
*H04N 21/2343* (2011.01)
*H04N 21/234* (2011.01)

(52) U.S. Cl.
CPC ............... *H04N 21/23412* (2013.01); *H04N 21/234318* (2013.01); *G06F 3/1454* (2013.01); *G09G 2340/02* (2013.01); *G09G 2340/0407* (2013.01); *G09G 2350/00* (2013.01)

(56) References Cited

U.S. PATENT DOCUMENTS

| | | | |
|---|---|---|---|
| 2009/0141522 A1 | 6/2009 | Adest et al. | |
| 2009/0210817 A1* | 8/2009 | Schmieder | G06F 3/1462 715/781 |
| 2010/0076613 A1 | 3/2010 | Imes | |
| 2010/0254603 A1* | 10/2010 | Rivera | G06F 3/1415 382/173 |
| 2011/0078532 A1* | 3/2011 | Vonog | G06F 3/1454 714/752 |
| 2011/0157196 A1* | 6/2011 | Nave | A63F 13/12 345/522 |

FOREIGN PATENT DOCUMENTS

| | | |
|---|---|---|
| EP | 0444666 A2 | 9/1991 |
| EP | 0810713 A2 | 12/1997 |
| EP | 1 293 887 A1 | 3/2003 |
| WO | 2009/040313 A1 | 4/2009 |

\* cited by examiner

METHOD FOR TRANSMITTING DIGITAL SCENE DESCRIPTION DATA AND TRANSMITTER AND RECEIVER SCENE PROCESSING DEVICE

BACKGROUND OF THE INVENTION

Field of the Invention

The invention relates to a method for transmitting digital scene description data from a transmitter scene processing device to at least one receiver scene processing device.

The invention is further related to a transmitter scene processing device and to a receiver scene processing device.

Background Description

There is a need of transmitting digital scene description data from a transmitter scene processing device to at least one receiver scene processing device and further using the transmitted digital scene description data with high quality. However, transmitting digital scene description data to be used in high quality requires transmitting a high amount of data in reasonable time and processing the digital scene description data in reasonable time.

Rendering procedures for reducing the amount of data to be transmitted are well known in the art. Rendering is a process of generating an image from at least one model or scene by means e.g. of computer programming instructions executed on a processing unit. A scene contains objects in a defined language or data structure. A scene comprises attributes e.g. for defining geometry, viewpoint, texture, lighting and shading for describing the scene. Executing rendering commands on digital scene description data including attributes results in an animated digital image or graphics image file.

The term "scene" as set forth in the present application comprises at least one picture, frame of a picture, or sequence of pictures, i.e. video.

A plurality of graphic processing tools is available to the public including OpenGL (Open Graphics Library) providing program instructions and related executables for rendering processing:

The OpenGL specification encoding resources comprising rendering libraries are available in the internet from the OpenGL organisation (http://www.opengl.org) without licence as open source. OpenGL is further described in the OpenGL reference manual: The Official Reference Document to OpenGL, Version 1.4 ($4^{th}$ Edition), Mar. 26, 2004, Editor Dave Schreiner, Addison-Wesley Professional and in Dave Schreiner, OpenGL Programming Guide: The Official Guide to Learning OpenGL, Versions 3.0 and 3.1 ($7^{th}$ Edition), Jul. 31, 2009, Addison-Wesley Professional.

US 2007/0153004 A1 discloses an animation file player provided for display animation files with an embedded system graphics application programming interface. For displaying an animation file information on a graphics enabled mobile device, an animation file is stored and converted to graphics rendering information. The graphics rendering information is passed to a mobile device graphics subsystem where the graphics rendering information is processed to obtain pixel data. An animation of the pixel data is displayed on a mobile device display.

WO 2009/040313 A1 discloses a method and system for remote visualisation of a graphics application using an OpenGL library. A local computer system comprises the OpenGL library and an encoder for translating operation systems specific OpenGL interface operations into operating systems independent operations for transmitting between the local computer system and one or more remote computer systems. The at least one remote computer system is comprising a decoder for decoding the operating system independent operations into operations of the second OpenGL interface for a second type of operating system. The operations may relay to windowing system specific rendering methods.

A problem of the prior art is that processing of digital scene description data on a device requires a lot of limited processing resources and limited battery power and that the bandwidth for transmitting the required amount of digital scene description data for higher resolution display is limited.

SUMMARY OF THE INVENTION

The object of the present invention is achieved by the method according to claim 1 and the transmitting and receiver scene processing device according to the independent claims.

According to the present invention, the method comprises the steps of encoding of scene description data and rendering commands in the transmitter scene processing device by
setting of priorities for the scene description data and related rendering commands and
dynamically reordering the scene description data and related rendering commands depending on the respective priorities in order to reduce the bandwidth required for transmission and/or to adapt to unreliable bandwidth; and transmitting the encoded scene description data and related rendering commands to the at least one receiver scene processing device for decoding and executing the rendering commands in relation to the transmitted scene description data by the at least one receiver scene processing device to achieve animated digital graphic.

According to the present invention, scene description data and related encoded rendering commands are transmitted from the transmitter scene processing device to the at least one receiver scene processing device for decoding and executing the encoded rendering commands in relation to the transmitted scene description data.

Thus, the transmitter scene processing device can be a mobile device with limited battery capacity, since executing the rendering commands is performed on the receiver scene processing device.

Further, the required bandwidth for transmitting digital scene description data is significantly reduced when transmitting digital scene description data and independent from these encoded rendering commands.

According to the present invention, the scene description data and related rendering commands are dynamically reordered having the effect of significantly reduced bandwidth for data to be transmitted to the at least one of the receiver scene processing devices.

Encoding by way of reordering of scene description data and related rendering commands and executing the rendering commands in the receiver scene processing device rather than transmitting an already rendered animated digital graphic in encoded and thereby compressed way has the advantage that the full information of the digital scene description data is maintained without loss of quality.

The effect of the method and the related transmitter scene processing device and receiver scene processing device is providing fast reaction speed and fluent animations over unreliable and especially narrowband links between transmitter scene processing device and at least one receiver scene processing device. The band links can also be wideband links. Besides wired links (e.g. TCP/IP links and USB links) the method works very well with wireless links (e.g. WiFi and Bluetooth), including disturbed wireless links. The wireless links which gain most of the present invention are specifically high-loaded and nasty unrelated disturbed connections, e.g. multi-WiFi access point environment where many concurrent, unrelated and variable active links act as disturber.

It is preferable to first transmit compressed digital scene description data, in particular texture data, from the transmitter scene processing device to the at least one receiver scene processing device. This will result in a reduced quality of the resulting rendered animated digital graphic. In order to achieve an improved graphic quality, the digital scene description data is later updated by transmitting the former compressed digital scene description data with higher quality from the transmitter scene processing device to the at least one receiver scene processing device. Thus, the available bandwidth can be used for updating the digital scene description data with higher quality, e.g. in uncompressed form. Thus, the animated digital graphic can be used first with reduced quality wherein the picture quality of the animated digital graphic is later improved by updating the digital scene description data without disturbing or interrupting the stream of animated digital graphic.

In a preferred embodiment, the digital scene description data transmitted from the transmitter scene processing device to the at least one receiver scene processing device includes vertex data provided for describing scene points of a scene. Said vertex data comprising the position of the respective scene point and attributes of the respective scene point provided for rendering an object related to the vertex data.

A vertex as set forth in the present application is a data structure that describes an scene point in two dimensional (2D), two and half (2.5D) or three dimensional (3D) space. 2.5D is a graphical projection which causes a series of images or scenes to fake or appear to be three-dimensional (3D) when in fact they are not.

When describing an object by use of an array of flat surfaces, e.g. triangles, the location and other attributes of the corners of the surfaces are defined by vertices. Thus, the vertices of the corner points of the triangles are associated with the position of the corner points and with additional graphic attributes including colour at the vertex point, the normal of an approximated curved surface at the position of the corner point, as well as textures and reflections of the surface of the related triangle. Thus, vertex data comprises the set of data which can be preferably encoded and transmitted in encoded and thereby compressed form from the transmitter scene processing device to the at least one receiving scene processing device in order to reduce the amount of data.

Since the image data e.g. useful for defining the texture can be transmitted independently from the vertex data e.g. without encoding and therefore without loss of quality, the animated graphic can be still displayed with high resolution and high quality even if the amount of data is reduced by encoding.

It is preferred to encode or compress the digital scene description data and in particular the vertex data, by use of delta compression. In the method of delta compression, the differences of actual digital scene description data to a preceding set of corresponding digital scene description data is calculated and transmitted. Delta compression is well known in the prior art of lossless data encoding. The method of delta compression has the advantage of a significantly reduced amount of data compared to transmitting the scene description data of one picture or frame itself.

Further, it is preferred when transmitting scene description data being primarily visible in an animated digital graphic for user and the rendering commands related to such prior scene description data with increased priority over (unprioritised) scene description data and related rendering commands having a secondary (reduced) visibility or being invisible in an animated digital graphic.

Thus, the available bandwidth and resources including battery power is primarily used for encoding and transmitting the primarily visible content of an animated digital graphic. The data content of minor priority being in the background or being invisible are processed with lower priority. The priority of scene description data and related rendering commands can be set according to the visibility of graphic content resulting from rendering these scene description data by use of related rendering commands. This method of priorisation of processing can be applied for encoding and transmitting the rendering commands only or applied to both encoding and transmitting the rendering commands and transmitting (with optionally prior compressing/encoding) related digital scene description data.

By ignoring the rendering commands related to invisible parts of an animated digital graphic and optionally the related digital scene description data itself, the required processing resources and bandwidth for transmitting is reduced. When processing scene description data and related rendering commands having a secondary visibility with reduced priority processing resources and bandwidth can be used at the time of availability without reduction of the available resources for processing the data for primarily visible content of the animated graphic.

Further, it is preferable to translate the rendering resolution of the digital scene description data provided by the transmitter scene processing device to a resolution desired for a display connected to a receiver scene processing device by processing digital scene description data in the receiver scene processing device. Therefore, the adaptation of the animation digital graphic to the resolution required for the receiver scene processing device is adapted by the receiver scene processing device. Thus, processing resources including available battery power is saved on the transmitter scene processing device. Adapting the resolution on the receiver scene processing device practically without significant loss of quality becomes possible by transmitting the digital scene description data with the method according to the present invention.

The method requires only loose or priority dependent synchronisation of both the transmitter scene processing device and the at least one receiver scene processing device. The reason is that the digital scene description data is transmitted independently from rendering commands wherein the rendering commands transmitted with reduced amount of data are executed on the digital scene description data in the receiver scene processing device.

In case that a period in which the receiver scene processing device is blocked to proceed with processing digital data exceeds a preconfigured time-limit, it is preferred that the at least one receiver scene processing device sends a synchronisation information to the transmitter scene processing device.

In a preferred embodiment, the characteristics of a channel used for transmitting the encoded scene description data and related rendering commands is measured. The step of dynamically reordering is controlled in relation to the actual measured characteristics of the channel. Such characteristics of a channel are for example the data transmission statistics, the reaction time (e.g. ping time) or the like. Such information about properties of the channel are often available as an output of an interface device or can be implemented by use of standard firmware resources.

The advantage of controlling the encoding process, i.e. the step of dynamical reordering, in dependence of the channel property has the advantage of adapting the amount of data to be transmitted to the receiver scene processing device in an optimised way to the available bandwidth of the channel.

Further, it is preferred to cache scene description data in a data memory of a receiver scene processing device. When encoding the scene description data in the transmitter scene processing device, such scene description data already cached in a related receiver scene processing device is not considered, e.g. by setting a priority of Zero. The cached scene description data is therefore not transmitted again. The cached scene description data can be reused from the memory by the receiver scene processing device when decoding and executing rendering commands related to such cached scene description data. This has the effect of a significant reduced amount of data to be transmitted from the transmitter scene processing device to the at least one receiver scene processing device.

The object is further achieved by the transmitter scene processing device comprising a data memory for storing digital scene data, at least one processing unit and at least one interface for connecting to at least one receiver scene processing device to transmit scene description data to the at least one receiver scene processing device.

The transmitter scene processing device according to the present invention comprises an encoder for encoding of scene description data and related rendering commands in the transmitter scene processing device by:
  setting of priorities for the scene description data and related rendering commands and
  dynamically reordering the scene description data and related rendering commands depending on the respective priorities in order to reduce the bandwidth required for transmission and/or to adapt to unreliable bandwidth.

Said rendering commands comprise instructions for obtaining an animated graphic from digital scene description data stored in the data memory when executing the instructions on a processing device. The transmitter scene processing device is arranged to transmit scene description data and related encoded rendering commands to at least one receiver scene processing device via the at least one interface.

The transmitter scene processing device is preferably arranged, e.g. by software programming with executables executed on the processing unit, to perform at least one of the aforementioned steps intended to be performed on the transmitter scene processing device.

The object is further achieved by the receiver scene processing device comprising a data memory for storing digital scene description data, at least one processing unit and at least one interface for interconnection to at least one transmitter scene processing device. The receiver scene processing device comprising a decoder arranged for decoding encoded rendering commands wherein the receiver scene processing device is arranged to execute the encoded instructions related to the rendering commands for obtaining an animated graphic from digital scene description data received from the at least one transmitter scene processing device via the interface when executing the instructions on the processing unit.

According to the transmitter scene processing device, the receiver scene processing device is preferably arranged to perform at least one of the steps intended to be performed on the receiver scene processing device, e.g. by software program executables to be executed on the processing unit.

BRIEF DESCRIPTION OF THE DRAWINGS

In the following, the invention is exemplarily described by way of an embodiment with the enclosed drawings. It shows.

DETAILED DESCRIPTION THE INVENTION

Figure 1:
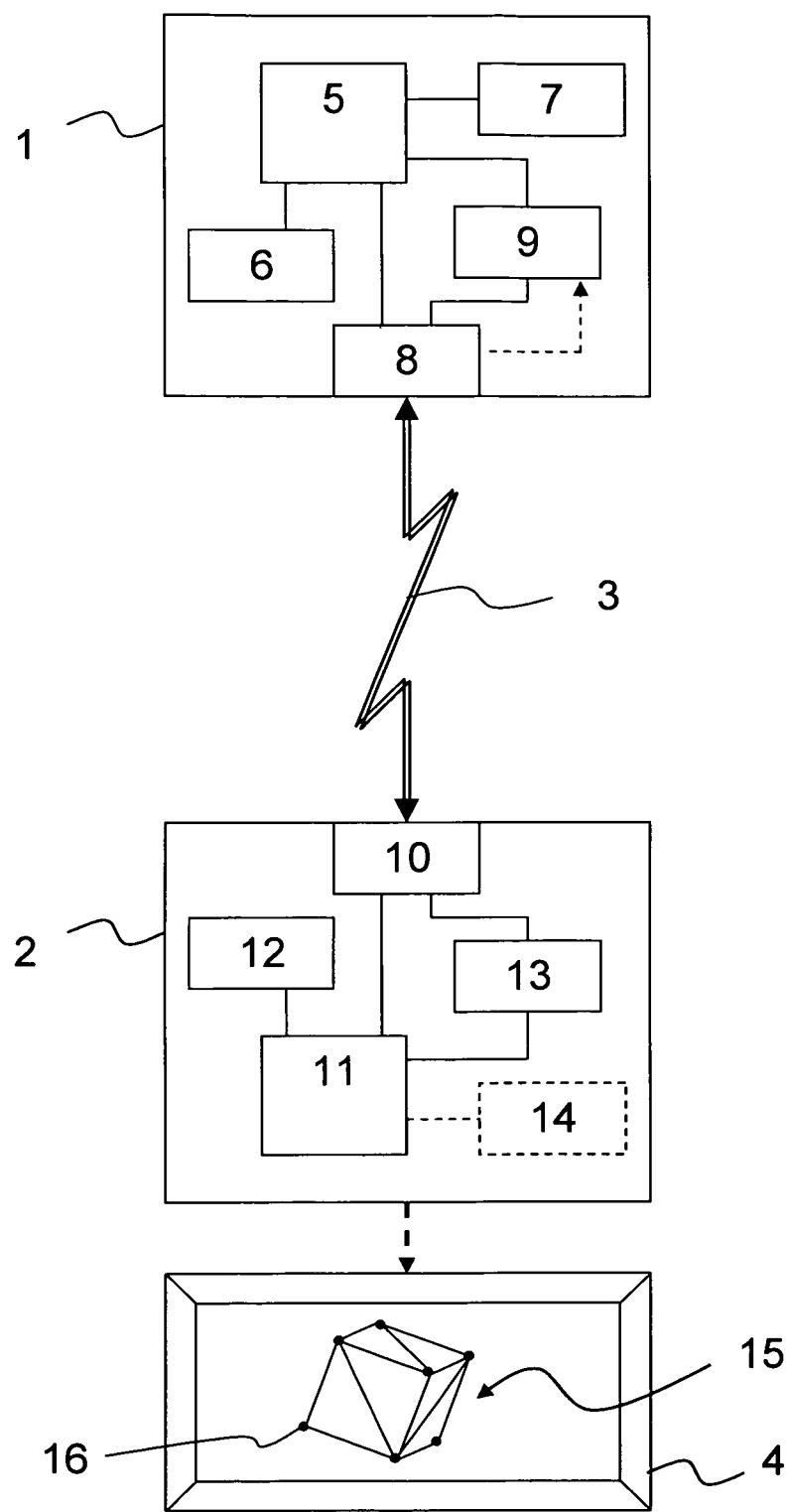
FIG. 1—block diagram of a transmitter scene processing device and receiver scene processing device interconnected with each other by a data link.

FIG. 1 shows a block diagram of a set of a transmitter scene processing device 1 and a receiver scene processing device 2 linked together by a data link 3. This data link can be for example a wire link making use of data transport protocols like TCP/IP- or USB-protocol or the like. More preferably, the data link 3 is a wireless link making use of data protocols like WiFi or Bluetooth or the like. Narrow band data links, e.g. WiFi and Bluetooth, are already available in many target devices so that the present invention can be implemented by means of firmware update.

The at least one receiver scene processing device 2 is connected to a display unit 4 provided for displaying an animated graphic processed by rendering digital scene description data on the receiver scene processing device 2.

The transmitter scene processing device 1 comprises a processing unit 5, e.g. in form of a programmable graphic processor, and a data memory 6 connected to the processing unit 5 provided for storing digital scene description data. Optionally, software program executables could be stored in the data memory 6.

Further, the transmitter scene processing device 1 comprises a rendering command library 7 including executables and/or commands for rendering of digital scene description data to achieve animated graphic. Such rendering command library can include for example the OpenGL library according to the OpenGL open source standard. However, the transmitter scene processing device 1 could also support any other rendering command language like VirtualGL, WebGL or the like according to the need of the user and according to a specific implementation chosen when designing the transmitter scene processing device 1.

The transmitter scene processing device 1 further comprises an interface 8 for connection to at least one receiver scene processing device 2. The interface 8 can be a wired or wireless interface 8 supporting e.g. the wire data transmission protocols TCP/IP, USB or the like or wireless data transmission protocols WiFi, Bluetooth or the like. Such interfaces 8 are commonly available in form or hardware blocks (integrated circuits), firmware or a combination thereof.

Further, the transmitter graphic processing unit 1 comprises an encoder 9 for encoding scene description data and related rendering commands stored in the rendering command library 7. The encoder 9 is arranged e.g. by software programming or in form of a logical hardware block to encode the scene description data and related rendering commands with the steps of setting priorities to scene description data and related rendering commands and reordering the scene description data and rendering commands in relation to the priorities set before such that the bandwidth required for transmitting the scene description data into related rendering commands is reduced and/or that the sequence of scene description data and related rendering commands is adapted to unreliable bandwidth.

For reordering the scene description data and related rendering commands, the encoder 9 caches (intermediate storing) scene description data and related rendering commands having a lower priority over high-priority scene description data and related rendering commands. When reordering the scene description data and related rendering commands, the encoder 9 can have access to the cache memory for changing and optimizing the sequence order of the scene description data and related rendering commands to achieve the afore mentioned object.

Preferably, the interface 8 comprises a measuring unit for measuring the properties of the channel, i.e. the data link 3. Such properties are for example the data transmission rate, the reaction time (e.g. ping time) or the like. As shown by the dotted arrow, the interface 8 controls the encoder 9 and in particular the steps of setting priorities, caching and reordering to adapt the data flow of the encoder 9 to the measured channel property.

One of the options is to transmit digital scene description data first in compressed form from the transmitter scene processing device 1 to the at least one receiver scene processing device 2. The result is that the required bandwidth for transmitting this type of data is highly reduced. However, there is a disadvantage of loss of quality when displaying an animated graphic based upon compressed data, since there is a loss of information when compressing data. To overcome this disadvantage, the digital scene description data will be updated later on by transmitting the former compressed digital scene description data with higher quality, e.g. in uncompressed form, from the transmitter scene processing device 1 to the at least one receiver scene processing device 2. The scene description data can be transmitted in data packets using any available bandwidth, which is not used for transmitting data with higher priority. The result is, that the quality of the animated graphic is later improved.

In practice, the lower quality of the animated graphic at the beginning will have no significant effect to a user when improving the graphic quality later on.

Another option is encoding of vertex data to compress the vertex data. The digital scene description data comprises vertex data among others, wherein the vertex data are provided for describing scene points of a scene point. The vertex data comprises a position of the respective scene point and attributes of the respective scene point. Said attributes may comprise information about texture, illumination, viewpoint, linewidth, scale factor, colour, reflectance of the related surface and the normal of an approximated curved surface at the location of the vertex.

When encoding the digital scene description data, in particular vertex data, the method of delta compression can be applied. Delta compression is well known in the prior art for lossless data encoding. In principle, the differences of actual scene description data to a preceding set of related scene description data is calculated and transmitted when performing the method of delta compression. Thus, not the absolute values of the actual scene description data are encoded and transmitted, but the differences of the actual scene description data to a preceding set of related scene description data. The amount of data of differences is significantly lower than the absolute data.

Another option is setting an increased priority to scene description data and related rendering commands, which results in graphic being primarily visible in an animated digital graphic for a user. Thus, those scene description data and related rendering commands causing animated graphic in the focus of an observer is privileged over scene description data and related rendering commands related to background graphic or even invisible parts of an animated digital graphic.

The receiver graphic processing unit 2 also comprises an interface 10 connected to the data link 3 and the transmitter scene processing device 1. The interface 10 corresponds to the interface 8 of the transmitter scene processing device.

The receiver scene processing device 2 further comprises a graphic processing unit 11 and a data memory 12 provided for storing digital scene description data including digital scene description data.

The receiver scene processing device 2 further comprises a decoder 13 for decoding the data stream received from the transmitter scene processing device 1. Said data stream comprises a sequence of digital scene description data and related rendering commands.

The graphic processing unit 11 of the receiver scene processing device 2 is arranged to execute rendering commands received in relation to digital scene description data received from the transmitter scene processing device 1. Preferably, the graphic processing unit 11 is controlled by respective firmware to execute the rendering commands and perform rendering for graphic processing.

Optionally, the graphic processor 11 can have access to a rendering command library 14 comprising executables e.g. in form of firmware or software code controlling the graphic processing unit 11 to perform specific steps of rendering. Then, the rendering commands received by the receiver scene processing device 2 from the transmitter scene processing device 1 can be limited to codewords related to executables stored in the rendering command library 14 of the receiver scene processing device 2.

The rendering command library 7 can be then restricted to a library of such codewords without need of storing executables in the transmitter scene processing device 1.

In the embodiment shown in FIG. 1, the rendering scene processing device 2 is (optionally) connected to a display 4 provided for displaying an animated digital graphic 15. Said animated digital graphic 15 comprises vertex data provided for describing scene points 16 of a scene.

Figure 2:
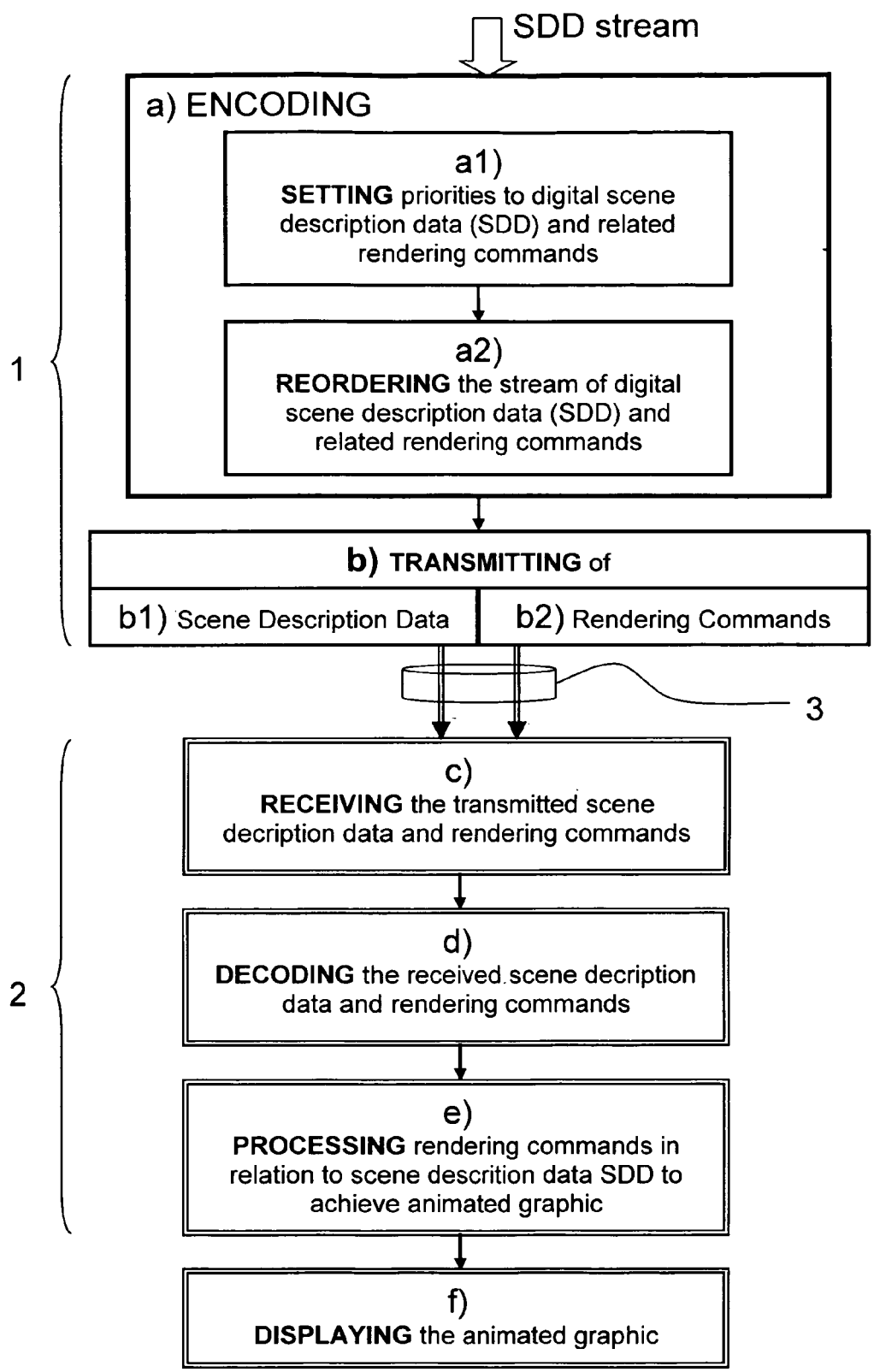
FIG. 2—flow chart of the method for transmitting digital scene description data from the transmitter scene processing device to at least one receiver scene processing device.

FIG. 2 shows a flow diagram of the method for transmitting digital scene description data and related rendering commands according to the present invention.

Based upon a stream of digital scene description data, SDD, the scene description data and related rendering commands will be encoded in the step a).

The step a) of encoding comprises the steps of a1) for setting of priorities for the scene description data SDD and related rendering commands and the step a2) of dynamically reordering the scene description data SDD and related rendering commands depending on the respective priorities, which are set in set a1) in order to reduce the bandwidth required for transmission and/or to adapt to unreliable bandwidth.

The step a) of encoding includes the step of caching scene description data and related rendering commands to store this data in case that decreased priority is assigned to such data. When caching such data, the encoder 9 can access this data later on to include this data in a stream of digital scene description data and related rendering commands. Thus, scene description data and related rendering commands with high priority, e.g. due to visibility of related animated graphic scenes in the focus of an observer, have the precedence over scene description data and related rendering commands with less priority.

The reordered sequence of digital scene description data and related rendering commands is then transmitted from the transmitter scene processing device 1 in step b) over the data link 3 to the at least one receiver scene processing device 2. It should be noted that the scene description data SDD will be transmitted—in a preferred embodiment—separately from the rendering commands over the same channel, i.e. data link 3. Thus, the step b) is divided in step b1) for transmitting the digital scene description data SDD and step b2) for transmitting the rendering commands. The digital scene description data SDD and the related rendering commands can also be transmitted separately from each other through different channels or can be transmitted combined in a common data packet via the same channel.

In the receiver scene processing device 2, the transmitted digital scene description data SDD and related rendering commands are received in step c).

Then, in step d), the received digital scene description data SDD and optionally the related rendering commands are decoded.

In step e) the rendering commands are executed e.g. by use of related executables stored in the rendering command library 14 of the receiver scene processing device 2 in relation to digital scene description data already received from the transmitter scene processing device 1. These related digital scene description data can be also data, which had been cached in the receiver scene processing device 2 for subsequent reuse of the same data content. Thus, recurring data content is allowed to be transmitted only once from the transmitter scene processing device 1 or any other source, e.g. data storage medium, to the receiver scene processing device 2.

The result of executing the rendering commands to process digital scene description data is an animated graphic which can be immediately displayed on a display in step f) or stored for later use.

In the following, preferred implementations of the present invention are presented:

Crystallization: The method according to the present invention is implemented in a multipart apparatus for a RemoteGPU (Remote Graphics Processing Unit) setup. This implements a protocol encoder, dynamic channel estimator and decoder methods for scene synthesis elements over low & unreliable bandwidth links.

A system implementing the present invention employs a method and apparatus for efficiently pre-processing, encoding, transmitting over data links and decoding of 2D, 2.5D and 3D scene synthesis elements and transformations between subsequent respective not subsequent but sufficient related scenes within a given timeframe and bandwidth. The approach is to optimize the position within the narrow link to the entropy of least data transport as optimal for the specific display object. Key methods of the present invention describe how to process the source-sink interaction on this optimal point to still achieve excellent reaction speeds. This will be detailed in the following.

The key-innovations described in the subsequent chapter are:
Introduce optimization methods which replace the traditionally frame synchronous respective isochronous and therefore significantly redundant and thus highly inefficient display communication to the underlying user and application intended scene change characteristics which are inherently asynchronous.
Maximal redundancy diminution using specific to each content related techniques
Recognition, Decoupling, Prioritization and reprocessing of reaction speed relevant versus less obvious visual content
Processing efficient Apparatus for dynamic channel estimation, encoding and decoding.
Power saving based on recognized user interaction and pre-estimated processing needs.
A priori and on demand channel property estimators
A priori and on demand application communication property estimators The apparatus suggested for implementing the method according to the present invention can appear at least in the following combination embodiments:

|  |  | Source - Encoder embodiment | | | |
| --- | --- | --- | --- | --- | --- |
|  |  | Phone | Laptop | Digi-Cam | PC |
| Sink - Decoder embodiment | TV | STB, Embed | STB, Embed | STB, Embed | STB, Embed |
|  | Monitor | Plug, Hub, Embed | Plug, Hub, Embed | Plug, Embed | All |
|  | Projector | Plug, Embed | Plug, Embed | Plug, Embed | All |
|  | Car | Embed | Embed | Embed | Embed |
|  | Glasses | Embed | Embed | Embed | Embed |
|  | PoS | All | All | All | All |

The mayor, but not all possible Sink—Decoder embodiment's are:
Plug: Tiny Decoder apparatus. Cable-plug sized. Connection over standard electrical interfaces like HDMI or DVI-I. Mounted externally at a plug of a display device.
STB: Medium size Decoder apparatus. Connection over standard electrical interfaces like DVI, HDMI, DisplayPort cable. May include additional TV-STB functionalities.
Hub: Medium size Decoder apparatus. Connects to the display over standard cable like DVI, HDMI, DisplayPort. Includes additional USB Hub for e.g. standard Keyboard and Mouse
Embed: The Decoder apparatus is implemented as chip or (part of) an ASIC inside the display device itself directly.
All: Any of the above selection (Plug, STB, Hub or Embedded) solution is equally well suited. The user selects based on further functionalities or price.

The various specifics of the possible Sink-Decoder embodiment's setup are:
TV: User is far away from display. External interfaces: HDMI.
Monitor: User sits directly next to display. Thus cable connection for e.g. standard Mouse and Keyboard devices are common place. These are input devices physically connected to decoder box and transported over the same medium to the processing unit which embodies the encoder. Typical embodiment is for example a Docking-station.

Projector: This device is not seldom mounted on the ceiling of the room. The display-cable for connecting the Laptop is available at the Meeting-room table. A receiver scene processing device (decoder) connects to this cable. This is either HDMI, or DVI-I incl. Sub-D VGA.

Car: No standard interfaces, thus typically directly embedded. Very specific set of Human Interface Device (HID): Keys and control on Steering wheel.
  One typical use-case is to select letters of a contact in the phone using the steering-wheel keys. Then select Navigate. The 3D Maps application in the phone shows on the main display of the car with fluent animations and instantaneous reaction speed.

Glasses: These are Near-to-Eye Displays (NED). The whole apparatus must be very lightweight and energy efficient for wirelessly powering the whole decoder system by one tiny battery.

PoS: Point of Sale. This display devices show advertisements in public places. This embodiment benefit from nicely respective eye-catching animated advertising. Often are a lot of these displays daisy-chained and benefit from an efficient communication with inherent multi-decoder rendering capabilities.

Further embodiments are seamless possible and benefit significantly from integrating methods according to the present invention:
  Ultra-silent Workstations: Connect to a Multi-user Server PC with fluent GUI
  Cloud based services: Presentation content stream CoDec WebGL (based on OpenGL|ES 2.0) stream accelerator.

The apparatus related user interaction options in suggested embodiments are predominantly:
  Single view
    Local display only: That is the old standard use
    Remote only: Local LCD is switched off (powersave)
      Touchscreen as on Laptop
  Dual view
    Mirroring the same scene
      Same resolution: Standard approach. Not suggested. Low Display utilization
      Re-rendered fullscreen view: Pixel accurate scene magnification, not scaling
    Extended Desktop: Well known from desktop OS
  Multi decoder view
    Mirroring: All display show same content but in native (different) resolution
    Extended Desktop: Possible, but not suggested
  Multi viewport frustum of same 3D scene
    Several user of a MUD (Multi User Dungeon) Game have their own 3D perspective
    Auto stereoscopic 3D displays derive (many) more than the traditional 2 views for many user viewing the same scene from their own perspective. This allows user to move. There is no narrow sweetspot anymore.

Valid embodiments of the present invention can implement at least all of the above options or any combination of subsets.

The utilization of OpenGL, specifically OpenGL|ES 2.0 API examples does not constitute any limitation for applicability of the methods implementing the present invention to any specific rendering API.

What is claimed is in the context of pre-render objects over unreliable interfaces:

Toplevel view: It is distinguished between the following general display objects:
  1. Media content: Premium respective self created content like compressed video, Images, Audio
  2. 2D and 2.5D GUI: This considers the support of traditional Desktops Graphics legacy
  3. 3D and vector based GUI: This can be fancy animated (2D, 2.5D or 3D) GUI, and Games As point 1. is already well covered in prior art but part of the proposed apparatus, the following claims center on points 2. and especially on 3. 2D and 2.5D GUI is considered as one (2D) or several parallel (2.5D) surfaces perpendicular to the 3D viewport.

Physical Interfaces

The physical interface used for implementing the present invention is depending on desired Application complexity and start-time requirements. The apparatus enables standard wired and wireless links to be used. For most vector and object based rendered GUI Applications Bluetooth is sufficient. To speed up Application start-time Bluetooth 3.0 is suggested. For start-time the WiFi-Phy is used for high-throughput, while during runtime typically Bluetooth 2.1 is sufficient. This allows significant power consumption reductions in contrast to WiFi or any wired or wireless frame-synchonous interface.

Related Graphics Elements

Typical PC graphics subsystems like X11 (Linux) or GDI (Windows) handle resources of which the displayed programs are constructed separately. This also applies to Smartphone graphics subsystems, too. This are:
  Bitmap resources like e.g. icons and backgrounds
  Text with reoccurring letters of specific fonts and sizes
  Scene construction descriptions like e.g. rectangular box (i.e. a Program window) on xy-position with xy-size, color containing i.e. linking or referring to other resources like e.g. icons.
  Static eye-candy: Alpha-shaded Porter Duff composition
  Dynamic Eye-candy: Euclidian, Similarity, Affine or further Projective Transformations
  OpenGL|ES elements such as e.g. vertices, vertex attributes, vertex-arrays, matrices, vertex shaders, fragment shaders, respective Textures with various properties Scene Transfer Protocol—General Overview The STP protocol consists of two independent uplink and one downlink connections. Connections are initialized by the encoder. The streams operate on different ports. Thus, in a Qualtity of Service (QoS) controlled environment the performance can be boosted further. The preferred methods consists of three connections—a $3^{rd}$ channel where each server sends back QoS evaluation results to client. Those information provide info about e.g. the current rendering speed (min, max and average FPS), load conditions that could be used by the client to optimize the network traffic.
  Command stream: Used to push actual GL commands. Those are small but crucial for a fluent user experience since they direct e.g. the GUI variation and rendering.
  Resource stream: Used to push binary resources such as textures. Those are large in terms of network communication.
  Statistics loop: Used to asynchronously implement a control loop to optimize dynamically client behavior based on measured of channel-, server- and render-HW statistics. The minimum set of topics is: rough IP network bandwidth, ping latency, maximum frame size, minimum frame size, rendering fps The separation between those two uplink communication channels ensures that a big texture upload does not block the rendering pipeline. Moreover, it allows the server to make decisions about rendering resources that have not arrived yet. For example, a missing texture can be rendered as solid color (e.g. grey), as background-color or checkered pattern (iOS style) or use a low resolution placeholder texture. Alternatively, the server can be directed to wait (block) for this specific resource to arrive.

The vector and object based methods are organized as follows: Set: Not modified GL, GL extensions, better represented, loop broken, new commands, group control commands e.g. WM., Decoder statistics.

Loose synchronization of encoders and decoders
    Object and visual importance dependent progressive transport and multi-step caching
        Transport of standard not modified GL resources,e.g. Textures
    Transport of standard not modified EGL and GL commands
    Transport of optimized represented GL commands
    Apparatus ease of usability methods
    Lower bandwidth solutions: scene-Graph encoding prioritization
    Usability improvement method
    Synchronization of Encoders and Decoders An apparatus implements loose synchronization. Most encoder methods require no tight synchronization with decoder or no synchronization at all. This applies especially to those animations without any user interaction. Other applications increase the number rendered frames per second depending on the device capabilities and utilization. That allows this application to appear more fluent on faster HW. To enable also such dynamic application adoption over this now much longer loop without suffering from synchronous in-loop delays, the encoder provides dynamic render guidance information locally. This is based on over the loop channel estimations and sink GPU capabilities. As the channel may change this measured throughput and delay-spread information with the according render guidance to the application is updated based on last rendered frames throughput. Depending on environment conditions and apparatus capabilities, this elaboration time-window is variable.

Further synchronization methods are introduced by unforeseeable blocking of the local respective remote render hardware. The application has no complete a-priori knowledge which of its commands will actually block the render hardware for a relevant period of time. Usually most commands including rendering commands cost neglect able time, while some seldom happening events will cause a normally irrelevantly fast command to be delayed a couple of milliseconds. This is caused by the actual implementation of the render hardware. The GPU blocks because it runs out of memory, needs to sync on a different core executing some previous work, waits for a buffer read arrival, etc.

The major advantage of an encoder according to the present invention is the almost complete decoupling from the blocking causing decoder HW. The application visible execution time for GL commands is approaching zero, since they are being buffered and not executed. Thus a client application would assume an unrealistic even about infinite frame rate. The encoder queue implementation is parameterized for far worse channel timing behavior than the render HW can cause delays and is capable to buffer this. The decoder method is to report back to encoder spurious blockings and drop warnings if this blocked time is beyond a preconfigured limit. The inverse number of the sum of all short term and partly medium term delays is the reported frame rate per second. This equalized possible frame rate is than enforced by blocking.

The following conditions will cause a GL function call to block in the client application:

Memory Threshold: If a certain fill-level is crossed in the amount of accumulated commands, e.g. 200 unsent commands are in the send buffer or in the amount of memory allocated to unsent resources reaches upper threshold.
    Initial Block Fps: Introduced by the client to cap the frame rate at a given level, e.g. 60 Fps. This initial value can increase if live channel estimations and actual render HW replay statistics indicate headroom.
    eglSwapBuffers call: This blocks if there are already 2 or more similar calls scheduled in the command queue not sent to the server yet. Commands in-between eglSwapBuffers calls represent full frame updates. This ignores partial updates, which are handled independently. If the encoder apparatus has more than 2 full frames scheduled, the client application is notified.
    Blocking and Re-Grouping Network Traffic
    By default commands extracted from the EGL API calls are inserted into a queue and depending on channel estimation and computed packet priorities written to the socket by the encoder. The socket is flushed when the frame is done. That is triggered by eglSwapBuffers command is received.
    However, to ensure perfect performance over congested or too bandwidth limited transport mediums like e.g. WiFi or Bluetooth, additional grouping and prioritisation methods affect the network dispatch. Those rules additionally group or block the command items and send them over in a human view importance specific arrangement. This includes lossless and lossy methods depending on the channel estimation and actual application requirements. The apparatus ensures based on human perception models under current conditions maximal fluent rendering results.
    The physical link optimization for example takes into account for TCP/IP packet sizes the specifically Maximum segment size (MSS) as matched block sizes to ensure that no IP fragmentation happens. As the size of MSS varies, this is initialized to a sane default and controllable through configuration when running in a well-known environment. The automatically optimized auto-adjustment is called during runtime and is based on the decoder feedback as a channel estimation feedback.
    Similar methods are embodied in the decoder apparatus to limit respective predict the required throughput and steer with this a-priory known performance needs the DVFS and deeper sleep modes the enhanced power-saving depending on the e.g. display timing and derived scene complexity needs.
    Scaling: Resolution Optimization Methods The decoder automatically translates the decoder rendering resolution to fit full screen. In practical terms, the application assumes it's rendering at local resolution e.g. 800×480 pixels for which it's written, while the decoder is actually pixel accurately rendering at e.g. 1920×1080.

If the aspect ratio of the encoded scene viewport is not identical to the decoding display device, the decoder apparatus uses letter boxing for more widescreen original content and Pillar boxing for a less widescreen original content to preserve the original aspect ratio.

If the resolution is different in any or both directions between the encoded and decoded resolution than the following methods apply:

The decoder calculates the required matrix at scene setup for the affine transformation matrix to transpose the vertex coordinates linearly from the viewport defined by the application running at the encoder side to the optimal coordinate system of the decoder side. The resulting frustum is than rendered as intended by the application, but rasterized at different typically much higher resolutions. For example: Resulting not orthogonal lines which would have ugly steps from a traditional bitmap-scaling appear pixel perfect drawn also on much higher resolution.

Bitmap content such as textures suffer of course from being mapped on a much higher resolution surface since that may require bitmap scaling if the original resolution of the texture it too low. To reduce this well known effects which become worse on higher resolution displays the decoder replaces an low quality scaling command which the application may have called expecting a low resolution display by the maximum quality scaler e.g. bilinear texture rendering of the decoder platform. Alternatively, as the encoder can report the true maximum resolution display apps may select a higher resolution texture. This method is also used to cope with bandwidth congestions. Here a subsampled quite low resolution texture is send over the narrowband interface, rendered and shown first. In the background a better quality, higher resolution and thus bigger amount of bulk data is transported and replaced by the decoder when arrived. Further methods from the short-term and longer term respective permanent caching methods are applied.

Managed Multi Caching

When encoding the screen description data and related rendering commands three different kind of caching data for reordering are of preliminary interest. In the persistent caching strategy the data are made available in a persistent data memory so that the data can be accessed during the complete time of processing an animated graphic. This requires increased amount of memory capacity versus the short or long dynamic caching strategy while having the advantage of great flexibility and effect of the reordering procedure. In the short or long dynamic caching strategy data is cached only for a long or short time so that reordering considers a time limited time frame of a sequence of animated graphics only. The advantage is that reduced memory capacity is required.

Resource Stream Optimization for Narrow Bandwidth Conditions

A preferred implementation of the method allow to progressively update a texture resource. The client at start can send a heavily-compressed JPEG version of the resource and update it with full-quality image later on. This method eliminates all round trips times from decoder to encoder, since the encoder doesn't need to wait for the decoder reply. When a program generates a texture resource on the client side, the encoder assigns a unique local id for it from it's pool. For instance, it provides the texture an id of 5. It pushes the request to the decoder with this id number to which the resource will be referred to by this particular client as 5. The client executes the actual on-chip resource creation command and gets, say, an id of 11. Now the decoder knows that client texture id 5 is an actual id 11. This mapping never needs to be communicated back to the encoder. The client will continue to use 5 when identifying the resource and the server mapps this as 11.

For a multiple encoders setup connecting to the same decoder, the decoder maintains this mapping separately for every connected encoder.

Lower Bandwidth Solutions:

Scene-Graph Based Encoding Prioritization Methods

The following methods are known in a different context for a different purpose in contrast to this in this invention. They have been used for improved processing of higher complexity sceneries with very high performance target points in local graphics accelerated systems. This is done to reduce by culling away primitives before processing them in detail and rendering for finally anyway not shown fragments to gain more available computation power to render the visible pixels.

The apparatus will use these known methods in the new application scenery as precedence encoding methods distinguishing transport relevance and priorities under significant bandwidth restricted situations to remote vertex buffers. The resulting effect of these methods are a much faster application start and faster not a-priori known scene changes with high complexity scenes under low bandwidth conditions. The traditional high performance methods named "View-Frustum culling", "occlusion culling", "Small feature culling" and "Level Of Detail (LOD) nodes" became now:

View-Frustum Reordering

The actual and momentary 2D view perspective into a 3D scene can be depicted like a pyramid stump (=frustum). Some of the 3D scene contents are already defined but outside of this view-frustum and therefore (initially) invisible.

The apparatus takes use of the "view-frustum culling" determination resp. testing methods to prioritize vertices located inside the view-frustum as priority 1 factor. Depending on the distance how far outside other vertices are is the priority decreasing. Thus the outside elements are not culled as in previous embodiments, but prioritized and reordered for transport also over even smaller band interfaces respective a faster visibility of the initially visible part.

Occlusion Reordering

Based on the actual view perspective some elements are hidden behind others which are visible from current perspective. The hidden elements are culled (i.e. removed) in previous embodiments. The encoder prioritized the visible vertices as priority 1 factor. In current view perspective hidden vertices are lower prioritized depending on previously determined bandwidth congestion situation.

Level of Detail (LOD) Nodes Reduction

This is an irrelevancy reduction method reducing the number of polygons, vertices to be below a certain threshold if the described figure is more far away in the 3D scene. This takes into account that the human view system typically doesn't notice details in the background that accurately in contrast to the foreground.

The encoder prioritizes under very low bandwidth conditions vertices with a smaller z-coordinate with a higher priority factor. That transports primitives in the foreground immediately, while the background details might be initially incomplete but loaded in the background and rendered afterwards.

This method is especially suggested also for not that narrow bandwidth conditions, if scenes with very high complexity are described with a lot of vertices but not yet arrived in the foreground.

Small Feature Reduction

This is an irrelevancy reduction method. Small features are often not required to provide the major impression of a 3D scene. This is considered as a lossy encoding option. This is only suggested as method of last resort and as such calculated with a lower priority expression factor.

The method is to lower prioritize vertices with coordinates which have low distance to others in at least two opposite directions. Also smaller triangles are lower prioritized. That means that edges have higher priority, while the detail depicted with several vertices to be shown on the surface between the edges is encoded with lower priority.

These methods are only used in very low bandwidth situations as last resort or to speed up too high complexity scenes. This approach allows still quite fast reaction to user interaction, but reduces the immediate ability to move the perceptivity within the 3D scenery. The lower priority elements are transported as best effort in the background. In case some details are transported later, this detail is included when it arrives at the decoder. Thus if the user doesn't move to fast the user will with increased likelihood not be bothered with this hard squeezed situation.

The following methods of encoding for data compression can be preferably used in the method:

Compression of Vertex/Index Data

Floating-point or 16/32-bit integer data doesn't compress well with traditional LZ-based approaches. As mostly neighboring vertex coordinates are encoded significant size reduction is achieved from delta coding. This encodes the base-value and represents the differences 'delta' between one value and the next with a much shorter representation. Thus neighboring vertices are referred as a common base encoding only using the offset.

Delta compression is also used for incremental transfers. The encoder maintains a full copy of base data. When transferring further data blocks, subtract the new data from the old data and transmit the difference. The difference information can typically be represented with much less data than the full data promises high gains for dynamic texture data.

Entropy Compression

An less efficient but more regular method for the command protocol stream encoder is the application for basic encodes stream with the known lossless entropy compression methods using e.g. zlib. Each frame is a packed and delivered as a compressed package. The decoder decomposes this back into individual commands and processes them individually.

A specific embodiment of entropy compression are:

Command and Object Specific Encoding Claims

The network format is as lean as possible with prioritization for low data, but visible reaction commands to ensure fast reaction, as the following are immediately visible to the user. The header is encoded with 16-bit command ID+16-bit size.

Function parameters are encoded in most compact way possible. e.g. GLenum: typically 32 bit on the CPU, but only 16 bits used. This is encoded as 16 bits and packed.

Stencil masks are handled as 32 bit on the CPU, but stencil buffers have just 8 bits thus the use for the present invention fragment packing here.

Color values are floating-point on the CPU, but display has just 8 bits.

The following methods can be applied in improved embodiments:

Progressive Textures Upload

Textures are sent fully asynchonous to the decoder over a separate stream. There is support for progressive uploads: The encoder first sends a quick low-resolution sub sampled version of the texture before sending the high detail texture which requires higher throughput. The encoder also downscales textures which are bigger then supported by the server-side GLES driver.

Dynamic Frame Shaping Support

Based on the feedback from the server, the client automatically adjusts it's FPS rendering ratio to fit the server/network performance.

Redundant Command skipping: The encoder maintains a local stack copy/state. This removes redundant high priority command traffic through skipping of commands that set values which are already set. For example end-user applications often reset state switches on every frame "just to be sure". Such behavior is detected and skipped.

Texture State Tracking Optimizations

For the global GL state, the encoder caches each texture's state and skips redundant operations. This optimizations are especially effective for Toolkits like Qt.

Simple functions as state changes, vertex attributes, and similar convey only a few bytes of data (0-16 for most, a few with 64) This are: glUse-Program, glTexParameteri, glUniform3f, glFlush, . . . . About half of all OpenGLES2.0 functions belong to this category.

In contrast to previous implementations are functions that transfer bulk data like texture data, vertex buffers, . . . . This can be any size from a few bytes to multiple megabytes. Some of this data is updated every frame. Examples: glTexImage2D, glBufferData, glDrawElements, . . . . These functions are the major bandwidth bottlenecks!

Special improvement: glVertexAttribPointer. In locally rendered OpenGL|ES, this function does not actually upload data to the graphics chip. Instead, it just updates a pointer to graphics data. Actual data isn't read until the next glDrawArrays or glDrawElements call. A preferred implementation state tracks this data referenced by a vertex attribute pointer since that may change every time between draw calls.

In contrast functions that transfer small amounts of data are e.g. strings identifying shader variables, lists of buffers, . . . . This is typically less than 100 bytes and not frequently used i.e. unlikely to occur in every frame. To this category belongs: glUniformLocation, glDeleteTextures, Functions that transfer strings are shader source or binary code communication whose typical range: is 100 bytes to 10 kBytes. Not frequently used i.e. unlikely to occur in every frame is glShaderSource, glShaderBinary. This both usually compresses well with common LZ-based lossless compression methods. Improved implementations of the present invention makes use of deferred indexing and standard compressed transfer.

The abbreviations used in the description have the following meaning:

API Application Programming Interface
DVI-I Digital Vision Interface-Integrated
DHCP Dynamic Host Configuration Protocol
DTV Digital Television
DVFS Dynamic Voltage and Frequency Scaling
EGL Embedded System Graphcs Library
FPS Frames per Second
GL Graphics Library
HDMI High Definition Multimedia Interface HW Hardware
LCD Liquid Crystal Display
LRU Least Recently Used
MSS Maximum Segment Size
MUD Multi User Dungeon
OpenGL Open Graphics Library
OpenGL|ES Graphics Library Embedded Solution
OS Operating System
PoS Point of Sale
QoS Qualtity of Service
QR Quick Response
RemoteGPU Remote Graphics Processing Unit)
SSID Service Set Identifier
STP Scene Transfer Protocol
Sub-D VGA Sub-D Video Graphics Array
TCP/IP Transmission Control Protocol/Internet Protocol
TV Television
USB Universal Serial Bus
VNC Virtual Network Computing
WebGL Web Graphics Library
WM Window Manager

The invention claimed is:

1. A method for transmitting digital scene description data and related rendering commands, the digital scene comprising at least one picture, frame of a picture, or sequence of pictures, said rendering commands comprising instructions for obtaining an animated graphic from digital scene description data when executing the instructions on a processing device, from a transmitter scene processing device to at least one receiver scene processing device, comprising the steps of:
    encoding of scene description data and rendering commands in the transmitter scene processing device for a scene having a plurality animated graphics by
        setting of priorities for the scene description data and related rendering commands by
            a) setting an increased priority for dynamically reordering in said step of encoding
            b) to scene description data and related rendering commands resulting in at least one graphic of said plurality of animated graphics being primarily visible in an animated digital graphic for a user,
            c) said increased priority being increased relative to priorities being set for scene description data and related rendering commands resulting in another graphic of said plurality of animated graphics having a secondary visibility or being invisible in an animated digital graphic,
        dynamically reordering the scene description data and related rendering commands depending on the respective priorities in order to reduce a bandwidth required for transmission and/or to adapt to unreliable bandwidth; and
    transmitting the encoded scene description data and related rendering commands to the at least one receiver scene processing device,
    decoding and executing the rendering commands in relation to the transmitted scene description data by the at least one receiver scene processing device, and
    producing an animated digital graphic by the at least one receiver scene processing device based upon the received scene description data and related rendering commands.

2. The method according to claim 1, wherein the transmitting step includes
    first transmitting compressed digital scene description data from the transmitter scene processing device to the at least one receiver scene processing device and
    later updating the digital scene description data by transmitting the former compressed digital scene description data with higher quality for the transmitter scene processing device to the at least one receiver scene processing device.

3. The method of claim 2, wherein said digital scene description data is or includes texture data.

4. The method according to claim 1, further comprising encoding vertex data provided for describing scene points of a scene comprising the position of the respective scene point and attributes of the respective scene point provided for rendering an object related to the vertex data, said vertex data being part of digital scene description data, and transmitting said encoded vertex data from the transmitter scene processing device to the at least on one receiving scene processing device.

5. The method according to claim 1, wherein said step of encoding scene description data by use of delta compression, wherein the differences of actual scene description data to a preceding set of related scene description data is calculated and transmitted.

6. The method according to claim 1, further comprising translating the rendering resolution of the digital scene description data provided by the transmitter scene processing device and being assigned to a first resolution to a second resolution desired for a display connected to a receiver scene processing device, said step of translating being performed in the receiver scene processing device and comprises multiplying scene description data for a scene with respective translation factors, said translation factors for related scene description data being dependent on the first resolution, the desired second resolution and the viewpoint for each of the scene description data or of the scene.

7. The method according to claim 1, further comprising sending a synchronisation information from one of the at least one receiver scene processing device to the transmitter scene processing device in case that a period in which a receiver scene processing device is blocked to proceed with processing digital data exceeds a preconfigured time-limit.

8. The method according to claim 1, further comprising measuring the property of a channel used for transmitting the encoded scene description data and related rendering commands and controlling the step of dynamically reordering in relation to the actual measured properties of the channel.

9. The method according to claim 1, further comprising caching of scene description data in a data memory of a receiver scene processing device, omitting of considering scene description data already cached in a related receiver scene processing device by setting a priority of Zero, when encoding the scene description data and related rendering commands in the transmitter scene processing device and reusing the cached scene description data from the memory by the receiver scene processing device when decoding and executing rendering commands related to such cached scene description data.

10. A receiver scene processing device comprising a data memory for storing digital scene description data, at least one processing unit and at least one interface for interconnection to at least one transmitter scene processing device, wherein the receiver scene processing device comprising a decoder arranged for decoding rendering commands encoded and transmitted according to the method of claim 1, wherein the receiver scene processing device is arranged to execute the encoded instructions related to the rendering commands for obtaining an animated graphic from digital scene description data received from the at least one transmitter scene processing device via the interface when executing the instructions on the processing unit.

11. The method of claim 1, wherein said scene description data is or included vertex data.

12. A transmitter scene processing device comprising a data memory for storing digital scene description data, at least one processing unit and at least one interface for connection to at least one receiver scene processing device to transmit scene description data to the at least one receiver scene processing device, the digital scene comprising at least one picture, frame of a picture, or sequence of pictures, wherein the transmitter scene processing device comprises an encoder configured for encoding of scene description data and related rendering commands in the transmitter scene processing device for a scene having a plurality of animated graphics by
    setting of priorities for the scene description data and related rendering commands by
        a) setting an increased priority for dynamically rendering in said step of encoding
        b) to scene description data and related rendering commands resulting in at least one graphic of said plurality of animated graphics being primarily visible in an animated digital graphic for a user,
        c) said increased priority being increased relative to priorities being set for scene description data and related rendering commands resulting in another graphic of said plurality of animated graphics having a secondary visibility or being invisible in an animated digital graphic, and
    dynamically reordering the scene description data and related rendering commands depending on the respective priorities in order to reduce the bandwidth required for transmission and/or to adapt to unreliable bandwidth, said rendering commands comprising instructions for obtaining an animated graphic from digital scene description data stored in the data memory when executing the instructions on a processing device, wherein the transmitter scene processing device is arranged to transmit scene description data and related encoded rendering commands to at least one receiver scene processing device via the at least one interface,
    the received scene description data and related rendering commands allowing the receiver scene processing device to produce an animated digital graphic by decoding and executing the rendering commands in relation to the transmitted scene description data by the at least one receiver scene processing device.

* * * * *